March 20, 1956  R. S. ZEBARTH  2,738,547
POULTRY TREATING APPARATUS
Filed Dec. 4, 1950  2 Sheets-Sheet 1
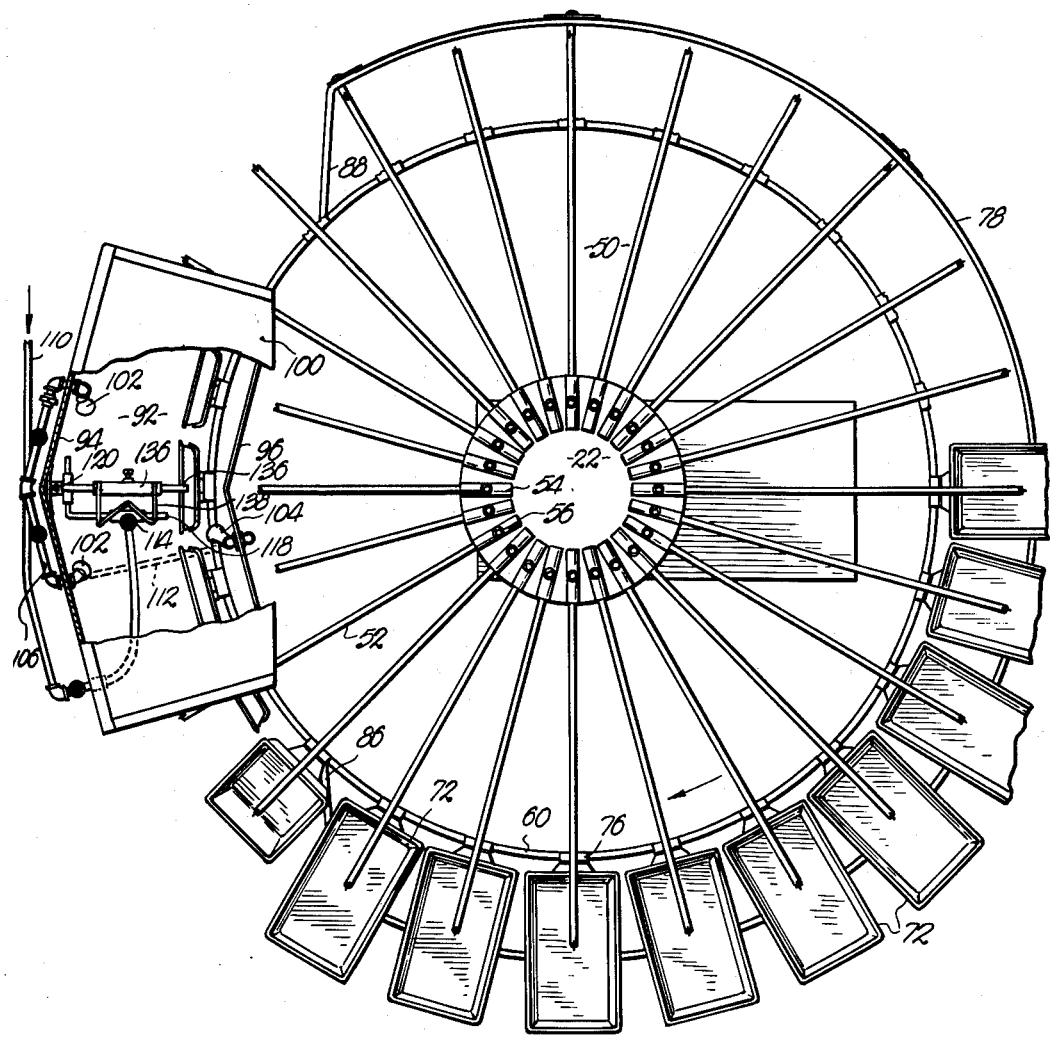
Fig. 1.
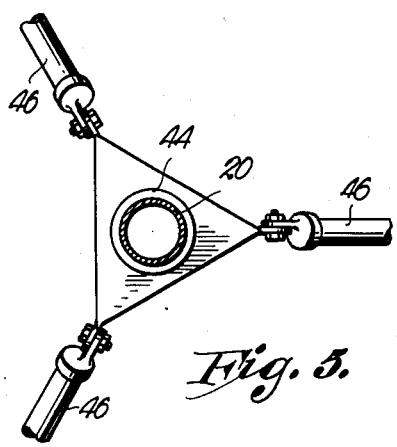
Fig. 3.
INVENTOR.
Ralph S. Zebarth
BY
ATTORNEY.

March 20, 1956 R. S. ZEBARTH 2,738,547
POULTRY TREATING APPARATUS
Filed Dec. 4, 1950 2 Sheets-Sheet 2
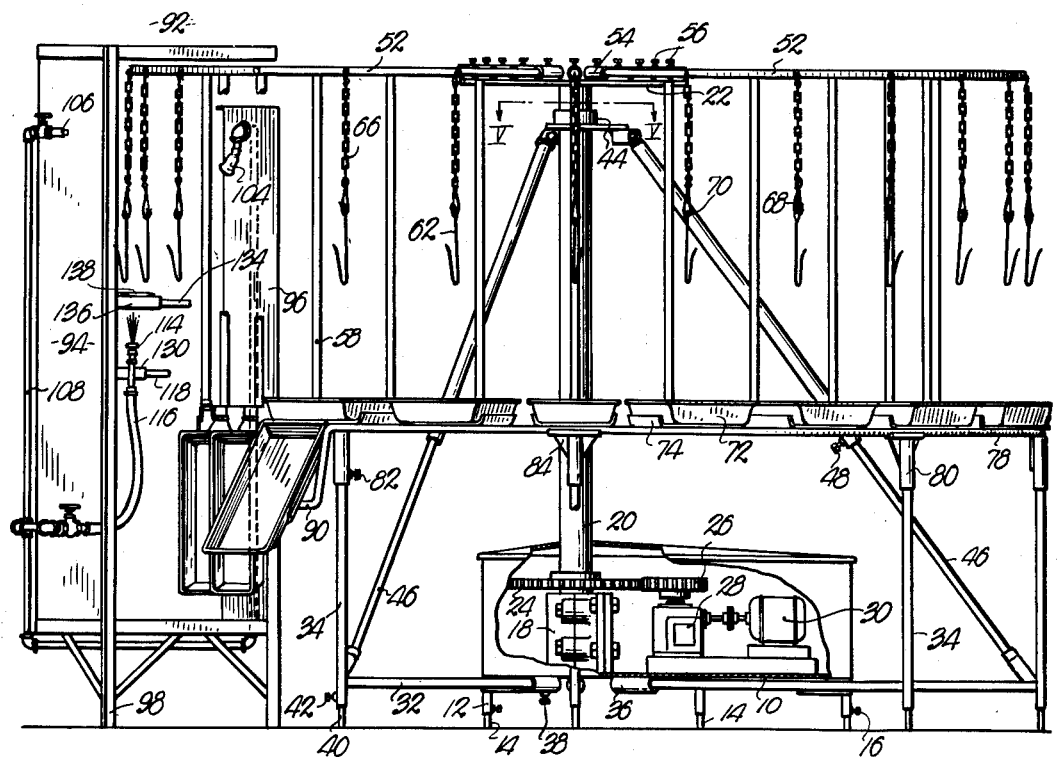
Fig. 2.
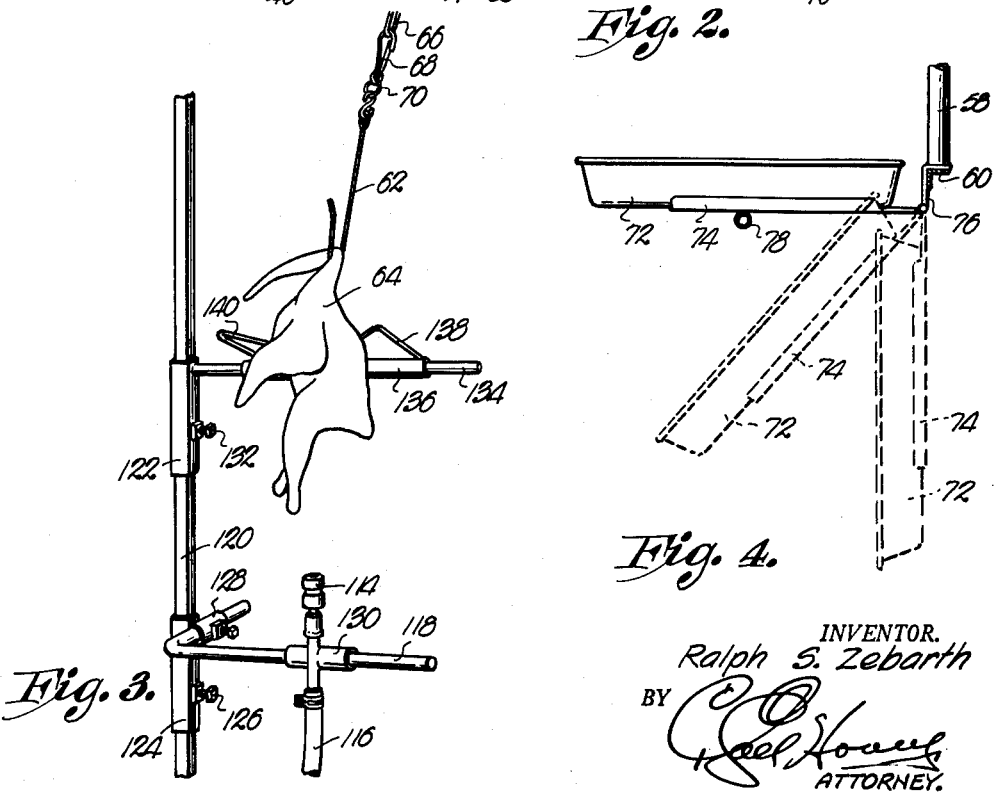
Fig. 3.
Fig. 4.
INVENTOR.
Ralph S. Zebarth
BY
ATTORNEY.

United States Patent Office 2,738,547
Patented Mar. 20, 1956

2,738,547
POULTRY TREATING APPARATUS

Ralph S. Zebarth, Hickman Mills, Mo., assignor to Gordon W. Johnson Company, Kansas City, Mo., a corporation of Missouri Application December 4, 1950, Serial No. 199,001

1 Claim. (Cl. 17—11)

This invention relates to equipment for use in the poultry industry and more particularly to apparatus usable to facilitate eviscerating, washing and packing of poultry and has for its primary object the provision of means to move the fowl through a spray chamber to automatically and quickly clean the same without operator attention.

It is the most important object of the present invention to provide rotatable structure having a plurality of poultry shackles suspended therefrom for holding birds being dressed in a position within easy reach of a number of employees, there being included means within the path of travel of the poultry as the same are moved by the rotatable structure for directing a cleaning fluid thereagainst after evisceration by the said employees.

Another equally important object of the present invention is to provide traveling means adapted to suspend a relatively large number of fowl and move the same through a circular path of travel together with receiving pans underlying each fowl respectively and rotatable therewith for carrying the removed viscera to a point of discharge.

It is another important object of this invention to provide apparatus above set forth wherein all of the viscera-receiving pans that underlie the shackles and consequently, the poultry suspended thereby are individually mounted for swinging movement to a dumping position whereby the contents of the pans may be dumped into a suitable receptacle periodically as the machine is placed in continuous operation.

It is a further object of this invention to provide a machine having the aforesaid characteristics and including a track underlying the hingedly mounted pans for holding the same in a normal horizontal position, the track being interrupted at one point along the path of travel of the pans to permit the latter to swing by gravity to a dumping position.

Other objects of this invention include the way in which the aforesaid shower or spray structure takes the form of a chamber through which the fowl pass; the manner of arranging the cleaning chamber to also receive the pans while in the dumping position, thereby cleaning the same; the manner of holding the birds within the spray chamber through a retarding action and thereby effecting a full cleaning action therein; and many other objects including details of construction such as the provision of a high degree of adjustability, all of which will be made clear as the following specification progresses.

In the drawings:

Figure 1 is a fragmentary, top plan view of poultry treating apparatus made pursuant to the present invention, parts being broken away to reveal details of construction.

Fig. 2 is a side elevational view thereof, parts being broken away for clearness.

Fig. 3 is a fragmentary perspective view of a portion of the spray chamber forming a part of the apparatus.

Fig. 4 is a detailed, sectional view illustrating one of the receiving pans and showing its manner of swinging movement; and Fig. 5 is a detailed, cross-sectional view taken on line V—V of Fig. 2.

As will hereinafter appear, the poultry handling equipment forming the subject matter hereof is capable of speeding the dressing of poultry considerably and effecting a more thorough cleaning thereof, all through provision of automatically operable parts eliminating operator attention to a considerable extent.

To this end there is provided a small horizontal table 10, having a number of relatively short tubular legs 12, having extensions 14 telescoped therein permitting levelling of the table 10 by means of setscrews or bolts 16 carried by each tubular leg respectively and normally engaging the extension 14 thereof.

The table 10 carries a bearing 18 for the lowermost end of an elongated, rotatable spindle 20 provided with a plate 22 rigidly secured to the uppermost end thereof. Rotative movement is imparted to the vertical shaft 20 by means of a pair of intermeshing gears 24 and 26 rigid to shaft 20 and to speed-reducer 28 respectively, the latter being operably coupled with an electric motor or other prime mover 30. It is noted that the prime mover 30 and the speed-reducer 28 are both mounted upon the aforesaid table 10.

A plurality of L-shaped frame pieces each including a horizontal rod 32 and an upright leg 34 have connection with the table 15 through the medium of short tubes 36 rigid to the lowermost face of table 10. The tubes 36 are each adapted to telescopically receive a corresponding rod 32 and setscrews or the like 38 for each tube 36 respectively, adjustably hold the corresponding rod 32 in place. The legs 34 are each rendered adjustable in the same manner as table 10 by means of extensions 40, telescoped within the lowermost ends of the legs 34 and adjustably held in place by means of setscrews 42.

Spindle 20 is provided with a bearing 44 near the uppermost end thereof and immediately below the plate 22 that is in turn held in place by a plurality of extensible, angularly disposed braces 46 that are connected at the lowermost ends thereof with certain of the above-mentioned L-shaped frames adjacent the point of connection between the rod 32 and the leg 34 thereof. Each brace 46 includes a tubular portion and a length telescoped within the tubular portion thereof adjustably interconnected by setscrews 48. It is noted that both ends of the braces 46 are releasably held in place to the end that the entire structure may be easily and quickly assembled and knocked-down.

The plate 22 forms the hub of a wheel broadly designated by the numeral 50 that is rotated by the spindle 20 and includes a plurality of spokes 52 radiating outwardly from the axis of rotation of the spindle 22. The spokes 52 are mounted at the innermost ends thereof to the plate 22 by means of a short tube 54 that telescopically receives a corresponding spoke 52 and holds the same in place by means of a setscrew 56. An upright rod 58 depends from each spoke 52 respectively near the outermost end of the latter but spaced therefrom and having rigid connection to its corresponding spoke 52 at the uppermost end thereof. The lowermost ends of all of the upright rods 58 are joined by an annulus 60 that is L-shaped in cross-section illustrated in Fig. 4. Accordingly, the annulus 60 circumscribes the spindle 20 and is concentric with the vertical axis of rotation of the latter. Each spoke 52 carries a shackle 62 taking the form of a substantially V-shaped hook to in turn support a chicken, turkey or other fowl 64 in the manner illustrated in Fig. 3 of the drawings. The shackles 62 are all suspended from the corresponding spoke 52 by means of a flexible connection such as a chain 66 that is releasably hooked to its spoke 52 at the uppermost end thereof.

The chains 66 which depend from the spokes 52 are each provided with a snap fastener 68 at the lowermost end thereof having a swivel 70 for interconnecting the chain 66 and the shackle 62.

A viscera-receiving pan underlies each shackle 62 respectively and is mounted upon a wear plate 74 that is in turn secured to the annulus 60 for swinging movement on a horizontal axis by means of a hinge 76. It is noted that the pans 72 radiate outwardly from the annulus 60 and are normally held in a horizontal position and against swinging movement in the manner illustrated in Fig. 4 by means of a track 78 spaced outwardly from and concentric to the annulus 60.

The track 78 is provided with a short, depending tube 80 for each leg respectively to telescopically receive the latter and thereby rendering the legs 34 adaptable to support the track 78. Adjustability between the tubes 80 and their legs 34 is made possible through the medium of setscrews 82. Gussets 84 interconnect the tubes 80 and the track 78 to add strength and rigidity. It is seen that the pans 72 are moved along the track 78 simultaneously with rotation of the shackles 62 and are normally held in a horizontal condition by the track 78. Track 78 however, is interrupted at one side thereof by a pair of spaced-apart, downwardly and inwardly inclined portions 86 and 88. In other words, each portion 86 and 88 extends downwardly at an angle from the horizontal plane of the main arcuate length of the track 78 with the portions 86 and 88 converging as the lowermost ends thereof approach. Additionally, each portion 86 and 88 angles inwardly toward a vertical plane through the annulus 60.

The lowermost ends of the portions 86 and 88 are joined by an arcuate guide 90 spaced below the annulus 60 and concentric with the axis of rotation of spindle 20.

A spray chamber broadly designated by the numeral 92 is disposed within the path of travel of the birds 64, shackles 62 and pans 72. Chamber 92 is formed by means of a pair of spaced-apart, vertical walls 94 and 96 mounted on framework 98, a top wall 100 and by side walls, if desired (not shown). The top wall 100 overlies the outermost ends of the spokes 52 and as illustrated in Figs. 1 and 2 of the drawings, the walls 94 and 96 are disposed at opposite sides of the annulus 60, shackles 62 and pans 72.

In the provision of side walls for the spray chamber 92, openings should be provided for clearing the chains 66, shackels 62 and the birds 64 carried thereby as well as the rods 58 and pans 72, it being further advisable to utilize flexible material in such side walls to eliminate the possibility of snagging by any part of the rotatable structure. It is noted further that a portion of the arcuate guide 90 forming a part of track 78, traverses the chamber 92.

A pair of spray heads 102 are carried by the wall 94 and a third spray head 104 is mounted on the wall 96 near the top wall 100 for directing a cleaning fluid such as clear water to the birds 64 as the same traverse the chamber 92. Spray heads 102 are interconnected by a valved manifold 106 that in turn has a vertical pipe 108 connected thereto exteriorly of the chamber 92, pipe 108 being supplied from a suitable source of cleaning fluid not shown, by means of an inlet pipe 110. Spray head 104 is likewise connected with supply line 110 through the medium of suitable conduits including line 112. A fourth spray head 114 joined with line 110 by means of conduit 116 is mounted upon an L-shaped bracket 118 within the chamber 92 and below the shackles 62 traveling through chamber 92.

Frame 98 includes a vertical bar 120 that is polygonal in cross-section and has a pair of sleeves 122 and 124 slidably, but not rotatably, mounted thereon. The sleeve 124 is adjustably held in place by a setscrew 126 bearing against the bar 120 and serves to mount the bracket 118 by means of a tube 128 thereon adjustably receiving one leg of the bracket 118. The other leg of bracket 118 is adjustably received by a small tube 130 on the spray head 114. The vertically reciprocable sleeve 122 adjustably held in place by setscrew 132 has an arm 134 extending outwardly therefrom having a tubular member 136 adjustably telescoping the same and provided with a substantially M-shaped retarding member 138 thereon. The member 138 is normally disposed at an angle upwardly and outwardly from the arm 134 as illustrated in Fig. 3 of the drawings and has a V-shaped bight 140 for receiving the birds 64 in the manner shown by Fig. 3.

In operation, continuous rotation of the spindle 20 upon energization of prime mover 30, moves all of the shackles 62 as well as all of the pans 72 in a circular path of travel circumscribing the axle of the spindle 20. The speed of rotation of the wheel 50 and its associated parts is governed by selection and adjustment of the speed-reducer 28. It is seen that such rotation of wheel 50 is accomplished by virtue of its connection with the uppermost end of spindle 20 through plate 22. Since all of the spokes 52 are provided with rods 58, in turn connected with the annulus 60, the latter will also be caused to rotate upon energization of the motor 30. Such rotation of annulus 60 about the vertical axis of spindle 20 carries the pans 72 along the track 78 as the plates 74 slide thereon.

Poultry to be treated is mounted upon the wheel 50 through the medium of the shackles 62 and as the same slowly rotate, operators positioned at various points at the periphery of the pans 72, can easily eviscerate the individual fowl 64 prior to passage thereof into the chamber 92. It is contemplated that the wheel 50 rotate in the direction illustrated by the arrow in Fig. 1 and as employees remove the entrails from the birds 64, the same are received by the individual pans 72 directly underlying the birds 64. It is also seen that any foreign matter falling from the birds 64 including liquids, will be collected by the pans 72. As the pans 72 progressively and successively reach the portion 86 of track 78, they wil swing downwardly by gravity in the manner illustrated in Figs. 2 and 4 to a position for dumping their contents immediately prior to entry into chamber 92. Any suitable receptacle may be disposed at one side of the chamber 92 for receiving the contents of the pans 72. Pans 72 continue through the chamber 92 in a substantially vertical condition, guided by the arcuate portion 90, and as the same reach the inclined portion 88 of track 78, they will again be guided to a substantially horizontal position riding along the track 78.

As the birds 64 and the pans 72 pass through the chamber 92, a cleaning liquid is directed thereto by means of the spray heads 102, 104 and 114. It is noted that the spray heads 102 and 104 are of an adjustable nature permitting directing of the liquid to the birds 64 and thereby thoroughly cleansing the same during the time the bird 64 is within chamber 92. Additionally, the liquid being sprayed within chamber 92, will cleanse the vertically suspended pans 72.

It is noted that the spray head 114 is disposed to direct liquid upwardly into the eviscerated bird 74, washing away foreign matter therewithin. Spray head 114 is located directly below the retarding member 138 and the latter is adjusted to receive the birds 64 successively and to temporarily retard full movement thereof while disposed directly above the spray head 114. In other words, through proper adjustment of the member 138, the birds 64 are received by the V-shaped bight 140 and while the wheel 50 continues to rotate, the birds 64 will be pulled upwardly over the member 138 and during such action, spray head 114 will effectively operate to thoroughly cleanse the inside of the bird 64. An operator standing adjacent the outlet end of the chamber 92, i. e. near the inclined track portion 88, removes the cleaned birds 64 from the shackles 62 and places additional fowl on the shackles 62 for dressing by other operators as above set forth In addition to all of the foregoing advantageous features of the poultry treating equipment herein set forth, it is particularly notable that the entire apparatus is light in weight, inexpensive to manufacture and easily assembled and disassembled as desired. All of the individual parts are not only fully separable one from the other, but a high degree of adjustment is provided to assure trouble-free operation over long periods of use.

The handling of poultry through the apparatus hereof and in the manner above described, eliminates much of the time-consuming tasks that are ordinarily found necessary and thereby the entire operation is speeded up considerably.

It is appreciated that details of construction as above set forth are limited to but one form of the present invention and that while only the preferred embodiment has been set forth, the broad principles hereof may be effected through many changes and modifications and it is, therefore, desired to be limited by the spirit of the invention as defined by the scope of the attached claim.

Having thus described the invention what is claimed as new and desired to be secured by Letters Patent is:

In poultry cleaning apparatus, a stationary shower stall provided with liquid spray means; a shackle support; an annular row of shackle-suspending devices secured to the support and depending therefrom; a poultry-receiving shackle attached to the lowermost end of each device respectively above a predetermined horizontal plane; means mounting said support for rotation on a vertical axis and in a position relative to the stall to successively move the devices and their shackles therethrough as the support is rotated; and an abutment within the stall immediately below said plane, said devices being flexible whereby poultry suspended from the shackles is retarded upon movement into engagement with said abutment and caused to dwell in liquid emanating from said spray means as the support is rotated continuously in one direction.

References Cited in the file of this patent
UNITED STATES PATENTS

| | | |
|---|---|---|
| Re. 16,079 | Lundell | May 19, 1925 |
| 1,637,096 | Allen | July 26, 1927 |
| 1,837,535 | Duffey et al. | Dec. 22, 1931 |
| 2,152,083 | Onorato et al. | Mar. 28, 1939 |
| 2,306,773 | Biffinger | Dec. 29, 1942 |
| 2,485,929 | Siegrist | Oct. 25, 1949 |
| 2,549,070 | Drews | Apr. 17, 1951 |
| 2,590,291 | Albright | Mar. 25, 1952 |

OTHER REFERENCES

"The U. S. Egg & Poultry Magazine," for October 1945, page 469.